United States Patent [19]

Nellis

[11] 3,853,327

[45] Dec. 10, 1974

[54] SELF-PRESSURIZING SHAFT SEAL

[75] Inventor: Veeder C. Nellis, Swampscott, Mass.

[73] Assignee: General Electric Company, Schenectady, N.Y.

[22] Filed: Oct. 3, 1973

[21] Appl. No.: 403,164

[52] U.S. Cl.................... 277/63, 277/67, 277/133, 277/53
[51] Int. Cl............................................ F16j 15/00
[58] Field of Search............ 277/13, 67, 53, 63, 133

[56] References Cited
UNITED STATES PATENTS

| | | | |
|---|---|---|---|
| 1,463,018 | 7/1923 | Junggren............................. | 277/53 X |
| 1,562,019 | 11/1925 | Wilkinson........................... | 277/56 X |
| 2,441,844 | 5/1948 | Rhoads............................... | 277/67 X |
| 2,846,245 | 8/1958 | Weaver............................... | 277/71 X |

Primary Examiner—Samuel B. Rothberg
Attorney, Agent, or Firm—John F. Ahern; James W. Mitchell

[57] ABSTRACT

A shaft is mounted in a bearing which is contained in a lubricant cavity. One wall of the lubricant cavity is formed by a lubricant deflector and an annular passage is defined by the shaft and the lubricant deflector. The shaft includes impeller means which include a flange having blade means mounted thereon. A self-pressurizing shaft seal includes a stationary baffle, which with the shaft, defines an annular space having the blade means disposed therein. Conduit means provide a fluid flow path into the annular space from the environment outside the stationary baffle. Duct means provide a fluid flow path out of the annular space into the environmental outside the stationary baffle at a location proximate to the annular passage defined by the lubricant deflector and the shaft.

11 Claims, 7 Drawing Figures

SELF-PRESSURIZING SHAFT SEAL

BACKGROUND OF THE INVENTION

1. Field of the Invention

This invention relates to shaft seals, and more particularly to an improved self-pressurizing shaft seal.

This invention was made under contract N00156-67-C-2581 with the United States Government, Department of the Navy.

2. Description of the Prior Art

For rotating shafts mounted in bearings requiring lubrication, it is common to bathe the bearing in lubricant to insure that proper lubrication takes place. In order to do this, a lubricant cavity which surrounds the shaft and has the bearing disposed therein is provided. It is necessary to prevent leakage from this lubricant cavity if proper lubrication is to be accomplished, and the most troublesome leakage problem exists at the interface between the rotating shaft and the stationary structure forming the lubricant cavity. The problem has been approached in the prior art by using a lubricant deflector to form one wall of the lubricant cavity.

Such prior art deflectors are formed of a disc having a central opening which fits closely around the shaft, providing an annular passage which is as small as possible while allowing the shaft to freely rotate. Circumferential grooves are often formed in the surface of the central opening, forming what is known in the art as a "labyrinth" deflector. The action of the rotating shaft in combination with the circumferential grooves of the labyrinth deflector creates a pressure differential which normally effects a seal between the lubricant cavity and the environment surrounding the shaft.

In a situation in which the shaft is coupled to associated rotating machinery by a flange which is located near the labyrinth deflector, additional problems in retarding lubricant flow through the annular passage may arise. As the shaft rotates in such arrangements, the fastening means used to fasten the flange to the associated rotating machinery will thus have kinetic energy associated therewith and will act as an impeller or centrifugal fan due to the projection of the boltheads or other fastening means from the surface of the flange. As the shaft rotates, the energy of the fastening means will be imparted to the fluid environment surrounding the shaft and will induce a radially outwardly spiraling fluid flow field. As this fluid flow field is set up, the proximity of the flange to the labyrinth deflector causes a low-pressure area to be established near the annular passage between the deflector and the shaft. Under some operating conditions, this pressure may be low enough to overcome the pressure differential due to the labyrinth deflector and cause lubricant to flow axially along the shaft through the annular passage, eventually causing bearing failure due to lack of lubricant.

The present invention uses the energy of the rotating fastening means to create pressure. The annular passage between the deflector and the shaft is then subjected to this pressure, thus surrounding it by a high pressure area. This prevents or severely retards the flow of lubricant from the cavity which would occur if the the annular passage was subjected to the low pressure area due to the impeller action of the fastening means.

In order to accomplish this result, a selfpressurizing shaft seal is provided. This selfpressurizing shaft seal comprises a stationary baffle which, along with the flange and shaft, forms an annular space having the fastening means disposed therein. The fastening means creates a high pressure in the annular space and duct means are provided to direct this pressure to the annular passage, thus retarding lubricant leakage therethrough.

SUMMARY OF THE INVENTION

It is a general object of this invention to provide a new and improved shaft seal.

It is another object of this invention to convert the energy of impeller means mounted on a shaft into pressure and then expose a location of potential lubricant leakage to the pressure.

It is another object to provide a stationary baffle to convert the energy provided by the rotation of fastening means on a flange mounted to a shaft into pressure and then expose an annular passage defined by the shaft and a conventional lubricant deflector to the pressure.

In one embodiment of the invention, a shaft has a lubricant cavity associated therewith. A lubricant deflector forms one wall of the lubricant cavity and the shaft and lubricant deflector define an annular passage therebetween. The shaft includes a flange for connecting the shaft to associated rotating machinery. Fastening means, which protrude from the surface of the flange, are used to secure the flange to the associated rotating machinery. A self-pressurizing shaft seal is formed by a stationary baffle which, along with the flange and shaft, defines an annular space having the fastening means disposed therein. A conduit means having a first end which communicates with the environment outside the stationary baffle and a second end communicating with the annular space at a location radially inward of the fastening means is provided. A duct means having a first end communicating with the annular space at a location near its periphery and a second end which communicates with the environment outside the stationary baffle is provided. The second end of the duct means is located proximate to the annular passage formed by the deflector and the shaft.

In a second embodiment of the invention, the deflector and baffle are an integral structure. The conduit means and duct means are formed by machining passageways through the integral structure.

In a third embodiment the concept of the present invention is used to provent intermixing of lubricants from two lubricant cavities which are spaced axially from each other along a shaft.

BRIEF DESCRIPTION OF THE DRAWINGS

A more complete understanding of this invention may be had by reference to the accompanying specification when taken in conjunction with the drawings of the invention, wherein.

DETAILED DESCRIPTION OF THE INVENTION

Figure 1:
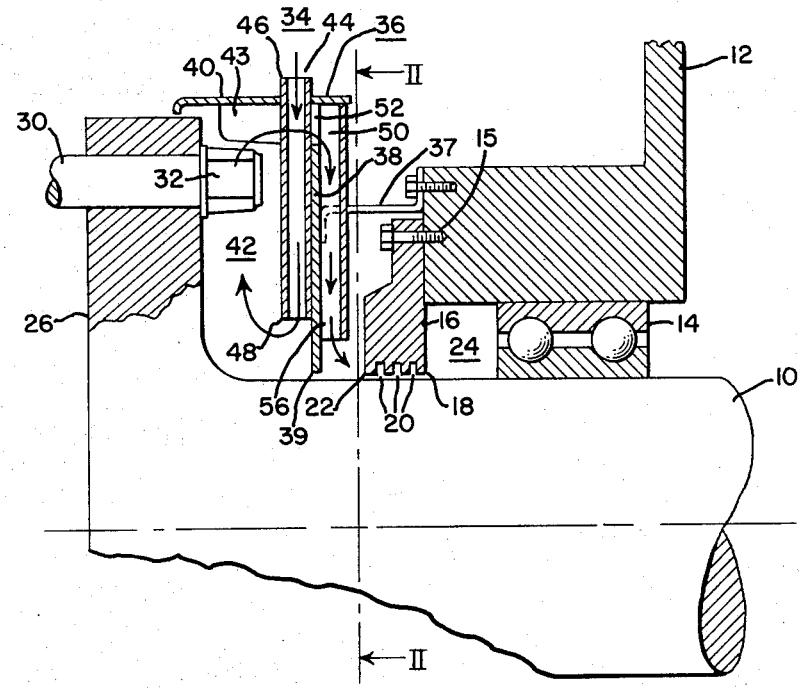
FIG. 1 is a side view, partially in section, of a portion of a shaft utilizing a self-pressurizing shaft seal according to one embodiment of the present invention.

Referring now to FIG. 1, there is shown a shaft 10 and a casing 12. Shaft 10 is mounted relative to casing 12 by a bearing 14, shown schematically. Mounted to casing 12 by screws 15 (only one of which is shown for clarity), or other suitable means, is a labyrinth oil deflector 16. Labyrinth oil deflector 16 is formed from a disc having a central opening 18, through which the shaft 10 passes. Circumferential grooves 20 are cut in the surface of central opening 18. Labyrinth deflector 16 and shaft 10 define a small annular passage 22 to allow clearance between shaft 10 and labyrinth deflector 16 in order to permit shaft 10 to rotate freely. A lubricant cavity 24 is formed by shaft 10, casing 12, and labyrinth deflector 16 and contains oil, or any other suitable lubricant, which bathes bearing 14 in a manner well known in the art.

Shaft 10 includes a mounting flange 26 which can be secured to associated rotating machinery (not shown) by fastening means. Fastening means will generally include a plurality of bolts 30, (only one of which is shown for clarity) which are disposed at regular intervals around flange 26 in a manner well known in the art. Each bolt 30 has a bolthead 32 associated therewith which protrudes from the surface of flange 26. A nut (not shown) or other suitable fastener will be screwed into the other end of bolt 32 to secure mounting flange 26 to the associated machinery. It is seen, of course, that mounting flange 26 may be secured to the associated rotating machinery by fastening means other than bolts 30 without departing from the spirit of the invention.

A self-pressurizing shaft seal 34 includes stationary baffle 36 formed from a plate 38 and an annular shroud 40. Plate 38 has a central opening 39 therein which fits as close to shaft 10 as possible while still permitting free rotation thereof. Stationary baffle 36 is mounted to casing 12 by brackets 37 (only one of which is shown for clarity), or other suitable means, so that stationary baffle 36, shaft 10, and flange 26 define an annular space 42 having boltheads 32 disposed therein. Stationary baffle 36 also includes a plurality of axially-extending ribs 43, suitably mounted to shroud 40 at regular intervals therearound, which extend in a generally radial direction into annular space 42. Selfpressurizing shaft seal 34 also includes conduit members which comprise conduit means for providing a fluid flow path into annular space 42. Each conduit member 44 has a first end 46 opening to the environment outside stationary baffle 36 and a second end 48 opening inside annular space 42 at a location radially inward of boltheads 32. Self-pressurizing shaft seal 34 further includes duct members 50 which comprise duct means for providing a fluid flow path out of the annular space 42. Each duct member 50 includes a first end 52 opening inside annular space 42 and a second end 56 opening to the environment outside stationary baffle 36. First end 52 is located adjacent to annular shroud 40 near the outer periphery of annular space 42 and second end 56 is located proximate to annular passage 22.

Figure 2:
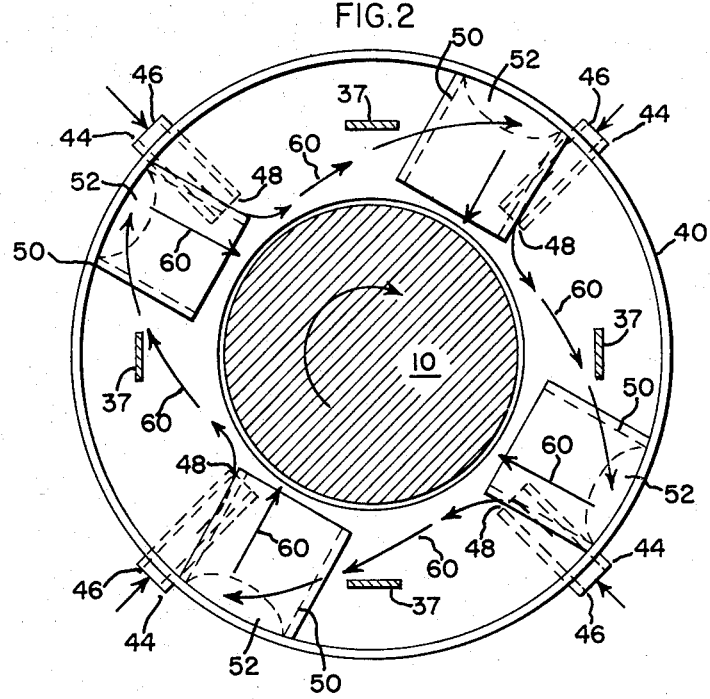
FIG. 2 is a sectional view taken along line II—II of FIG. 1.

Referring to FIG. 2, there are seen to be four conduit members 44, each formed from a tube which extends through shroud 40 in a generally radial direction and is welded, or otherwise suitably mounted, thereto. Conduit members 44 are located at spaced intervals with respect to the circumference of shaft 10. There are also four duct members 50 which are generally radially directed and are located at spaced intervals with respect to the circumference of shaft 10. Each duct member 50 is made of a sheet metal channel having its ends welded, or otherwise suitably mounted, to plate 38.

In operation, as shaft 10 rotates, mounting flange 26 and boltheads 32 act as an impeller to draw air into first end 46 of conduit members 44 from the environment outside stationary baffle 36. The air enters annular space 42 through second end 48 of conduit means 44. The impeller action of the mounting flange 26 and boltheads 32 causes a circumferential flow of air within annular space 42. A pressure rise is produced within annular space 42 as the air flow impinges against the axial-extending ribs 43. Annular passage 22 is exposed to this pressure by duct members 50, each of whose second end 56 is located proximate thereto. The manner in which duct members 50 are formed exposes as much of annular passage 22 to pressure as is possible. The subject invention causes the greatest pressure at the second end 56 of duct members 50, and thus at annular passage 22, when the first end 52 of each duct member 50 is located near annular shroud 40, that is, radially outward of boltheads 32 as far as possible. This is because the region of greatest pressure within annular space 42 is at its outermost radial location. Since mounting flange 26 and boltheads 32 set up a fluid flow, represented by arrows 60, ribs 43 are placed near the first end 52 of duct members 50 in order to convert the energy of the fluid flow into a pressure rise.

It will be seen by one skilled in the art that it is necessary to the operation of the subject invention to locate first end 52 of duct means 50 adjacent to annular shroud 40. It is also necessary that first end 52 of duct members 50 communicate with annular space 42 at a location radially outward of the second end 48 of conduit members 44 so that air will flow through conduit members 44, rather than duct members 50, into annular space 42. Those skilled in the art will also recognize that ribs 43 may be omitted without departing from the spirit of the invention. Since the axial protrusion of conduit members 44 within annular space 42 inherently provides the radial baffle needed to permit the air impingement action. Further, the subject invention is intended to include applications in which the fluid environment is other than air, such as for example, submerged motors.

Figure 3:
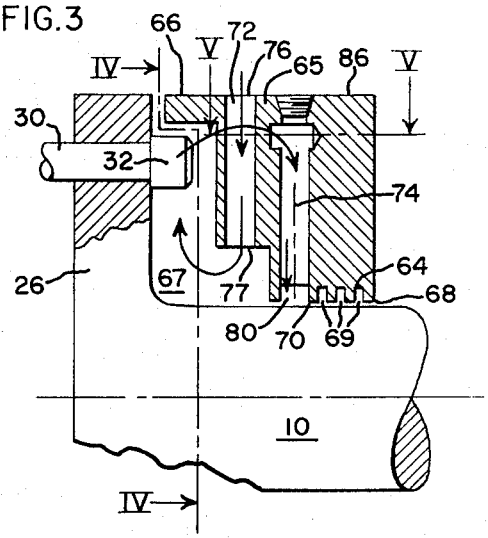
FIG. 3 is a side view, partially in section, of a portion of a shaft utilizing a self-pressurizing shaft seal according to a second embodiment of the present invention.

Referring now to FIG. 3, a second embodiment of the present invention is shown. Shaft 10 includes mounting flange 26 and fastening means comprising bolts 30 and boltheads 32 as described above. In this embodiment, a labyrinth deflector 64 and a stationary baffle 65 are formed from an integral structure, comprising an annular shroud 66 and a ring member 86. Ring member 86 has a central opening therein which fits as close to shaft 10 as possible while still permitting free rotation thereof. Stationary baffle 65, shaft 10 and flange 26 define an annular space 67 having boltheads 32 disposed therein. Labyrinth deflector 64 is similar in construction to that defined in connection with FIG. 1 and has a central opening 68 with circumferential grooves 69 therein. An annular passage 70 is defined by shaft 10 and labyrinth deflector 64. Conduit members 72 and duct members 74 are suitably formed in the integral structure, such as by drilling. Each conduit member 72 has a first end 76 opening to the environment outside the stationary baffle 66 and a second end 77 opening inside annular space 67 at a location radially inward of boltheads 32. Each duct member 74 has a first end 78 (not shown in FIG. 3) opening inside annular space 67 and a second end 80 opening at a location proximate to annular passage 70.

Figure 4:
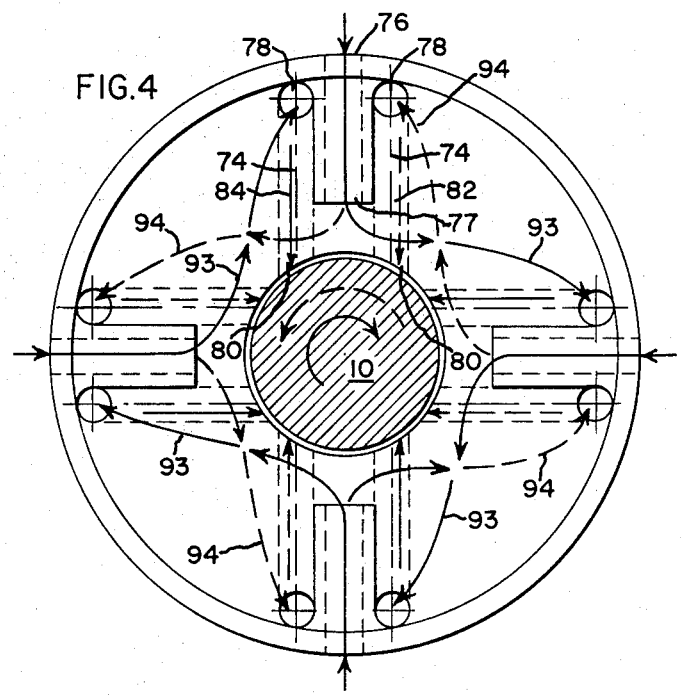
FIG. 4 is a sectional view taken along line IV—IV of FIG. 3.

Referring now to FIG. 4, there are seen to be four duct members 74, each comprising a first duct member 82 and a second duct member 84. There are also four conduit members 72, each having one of duct members 74 associated therewith in a manner whereby first end 78 of first duct member 82 is located proximate to and spaced counterclockwise from first end 76 of associated conduit member 72, and first end 78 of second duct member 84 is located proximate to and spaced clockwise from first end 76 of associated conduit member 72.

Figure 5:
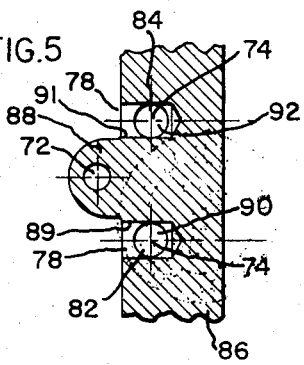
FIG. 5 is a sectional view taken along line V—V of FIG. 3.

Referring now to FIG. 5, the axial orientation of conduit members 72 and duct members 74 is shown. Ring member 86 has axial ears 88 (only one of which is shown for clarity) which protrude into annular space 67. Each axial ear 88 has a conduit member 72 formed therein. Duct members 74 are formed in ring member 86. Each duct member 74 includes a radially directed portion and an axially directed portion. First duct member 82 has its axially directed portion 89 formed adjacent to axial ear 88 and counterclockwise thereof with its radially directed portion 90 meeting axially directed portion 89. Second duct member 84 has axially directed portion 91 formed adjacent to axial ear 88 and clockwise thereof with radially directed portion 92 meeting axially directed portion 91.

The second embodiment herein shown and described operates similarly to the first embodiment described above. However, by providing first and second duct members 82, 84 associated with each conduit member 72, lubricant leakage through annular passage 70 may be more efficiently retarded for either clockwise or counterclockwise rotation of shaft 10. The fluid flow through annular space 67 in the second embodiment of the invention is best seen in FIG. 4. When shaft 10 rotates in the clockwise direction, the fluid flow is represented by solid lines and arrows 93. When shaft 10 rotates in the counterclockwise direction, fluid flow is represented by dotted lines and arrows 94.

Figure 6:
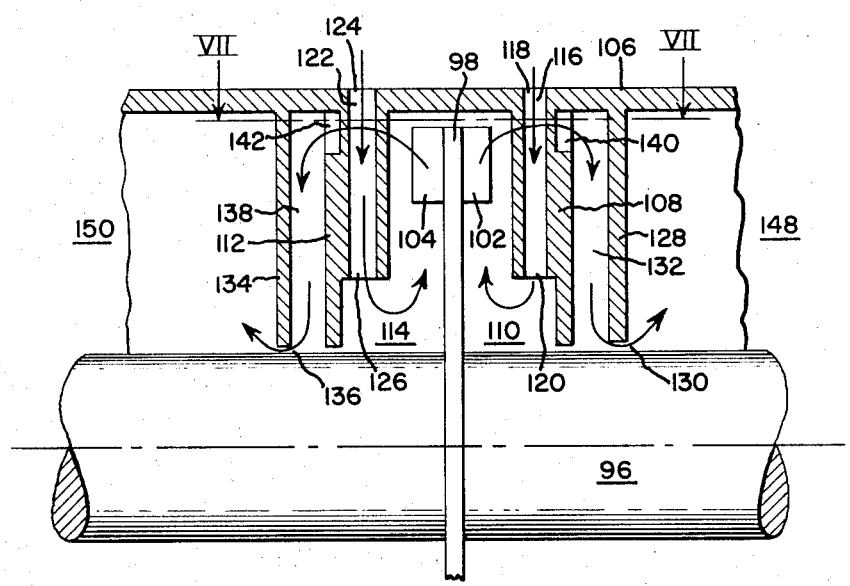
FIG. 6 is a side view, partially in section, of a portion of a shaft utilizing a self-pressurizing shaft seal according to a third embodiment of the present invention.

Referring now to FIG. 6, a third embodiment of the present invention is shown. In this embodiment, the concept of transforming fluid flow energy imparted by impeller means into pressure is utilized to prevent crossflow between two lubricant cavities.

A shaft 96 has impeller means mounted thereon. The impeller means includes a flange or disc 98 which is normal to the axis of shaft 96. A first blade means 102 is mounted on one side of disc 98 and a second blade means 104 is mounted on the other side of disc 98. A generally cylindrical casing 106 is provided which is coaxial with shaft 96. A first wall 108, formed from a plate having a central opening, is secured to casing 106, with the central opening sized to fit as tightly as possible around shaft 96 while still permitting free rotation thereof. Casing 106 and first wall 108 form a stationary baffle, which with disc 98 and shaft 96, forms a first annular space 110 having first blade means 102 disposed therein. A second wall 112, formed from a plate having a central opening, is secured to casing 106, with the central opening sized to fit as tightly as possible around shaft 96 while still permitting free rotation thereof. Casing 106 and second wall 112 form another stationary baffle, which with disc 98 and shaft 96, forms a second annular space 114 having second blade means 104 disposed therein.

A first conduit means includes a plurality of generally radially directed first conduit members 116 (only one of which is shown in FIG. 6 for clarity), which first conduit members 116 are located at regular intervals with respect to the circumference of shaft 96, for providing a fluid flow path into first annular space 110. Each first conduit member 116 has a first end 118 opening to the environment outside casing 106 and a second end 120 opening inside first annular space 110 and communicating therewith at a location radially inward of first blade means 102. A second conduit means includes a plurality of generally radially directed second conduit members 122 (only one of which is shown in FIG. 6 for clarity), which second conduit members 122 are located at regular intervals with respect to the circumference of shaft 96, for providing a fluid flow path into second annular space 114. Each second conduit member 122 has a first end 124 communicating with the environment outside casing 106 and a second end 126 communicating with second annular space 114 at a location radially inward of the second blade means 104.

A first deflector 128 extends radially inward from casing 106, to which it is suitably secured, and, with shaft 96, defines a first annular passage 130. A first annular duct means 132 is defined by first wall 108, casing 106, shaft 96, and first deflector 128. A second deflector 134 extends radially inward from casing 106, to which it is suitably secured, and defines second annular passage 136 with shaft 96. A second annular duct means 138 is defined by second wall 112, casing 106, shaft 96, and second deflector 134. First wall 108 has a plurality of apertures 140 (only one of which is shown in FIG. 6 for clarity) located therein adjacent to casing 106. Second wall 112 has a plurality of apertures 142 located therein (only one of which is shown in FIG. 6 for clarity) adjacent to casing 106.

Figure 7:
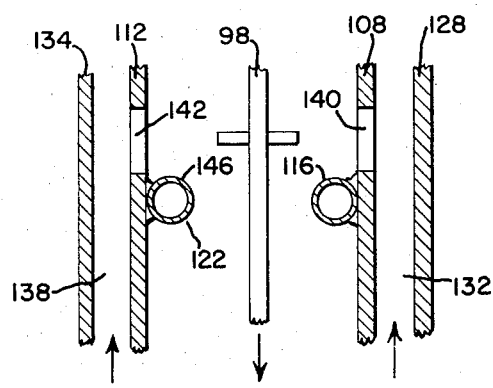
FIG. 7 is a sectional view along line VII—VII of FIG. 6.

Referring now to FIG. 7, it is seen that each first conduit member 116 is a tube which is welded, or otherwise suitably attached, to first wall 108. Each second conduit member 122 is a tube which is welded, or otherwise suitably attached, to second wall 112.

In operation, the embodiment shown in FIGS. 6 and 7 prevents intermixing of lubricants from lubricant cavities 148 and 150. Blade means 102, 104 cause fluid to flow from the environment outside casing 106 into annular spaces 110, 114 through conduit members 116, 122, respectively. The stationary baffles convert the energy imparted to the fluid by the impeller means into a pressure rise. Annular passages 130, 136 are then subjected to this pressure by annular duct members 132, 138, respectively. By subjecting annular passages 130, 136 to pressure, lubricant flow from cavities 148, 150 through annular passages 130, 136, respectively, is prevented or severely retarded.

It will be readily seen by one skilled in the art that casing 106, although necessarily cylindrical in nature, does not have to be of a single diameter. That is, the first annular space may be a different diameter than the second annular space without departing from the spirit of the invention. Further, it will be recognized that it is necessary to locate apertures 140, 142 near casing 106 as well as to have apertures 140, 142 radially outward of the second ends 120, 126 of conduit members 116, 122, respectively.

Although three specific embodiments of the invention have been shown, those skilled in the art will perceive modifications other than those specifically pointed out which can be made without departing from the invention, and it is intended by the appended claims to cover all such modifications as fall within the true spirit and scope of the invention.

What is claimed as new and desired to be secured by Letters Patent of the United States is:

1. A self-pressurizing shaft seal for retarding the flow of lubricant through an annular passage defined by a lubricant deflector and a shaft wherein:
   a. said shaft includes:
      i. flange means mounted on said shaft, and
      ii. blade means mounted on said flange means; and
   b. said self-pressurizing shaft seal includes:
      i. a stationary baffle wherein:
         A. said stationary baffle and said shaft define an annular space, and
         B. said blade means is disposed in said annular space, and
      ii. conduit means for providing a fluid flow path into said annular space, said conduit means having:
         A. a first end opening to the environment outside said stationary baffle, and
         B. a second end opening inside said annular space and communicating with said annular space at a location radially inward of said blade means, and
      iii. duct means for providing a fluid flow path out of said annular space, said duct means having:
         A. a first end opening inside said annular space and communicating with said annular space at a location radially outward of said second end of said conduit means, and
         B. a second end opening to the environment outside said stationary baffle at a location proximate to said annular passage.

2. The self-pressurizing shaft seal recited in claim 1 wherein:
   a. said flange means includes a mounting flange for mounting associated rotating machinery to the shaft; and
   b. said blade means includes fastening means for securing said mounting flange to said associated rotating machinery.

3. The self-pressurizing shaft seal recited in claim 2 wherein:
   a. said stationary baffle includes an annular shroud encircling said shaft, said annular shroud being outward of said fastening means and a plate secured to said annular shroud, said plate having a central opening therein through which said shaft passes;
   b. said annular space is defined by said mounting flange, said annular shroud, said plate and said shaft;
   c. said conduit means comprises a plurality of generally radially directed conduit members extending through said annular shroud, said conduit members being located at spaced intervals with respect to the circumference of said shaft and including:
      i. a first end opening to the environment outside said stationary baffle, and
      ii. a second end opening inside said annular space at a location radially inward of said fastening means; and
   d. said duct means comprises a plurality of channel shaped, generally radially directed duct members secured to said plate, said duct members being located at spaced intervals with respect to the circumference of the shaft and including:
      i. a first end opening inside said annular space and communicating with said annular space at a location adjacent to said annular shroud, and
      ii. a second end opening to the environment outside said stationary baffle at a location proximate to said annular passage.

4. The self-pressurizing shaft seal recited in claim 3 wherein said annular shroud includes a plurality of axially extending ribs located inside said annular space at a location proximate to said first end of said duct members.

5. The self-pressurizing shaft seal recited in claim 4 wherein said plurality of conduit members and said plurality of duct members are each four in number.

6. The self-pressurizing shaft recited in claim 2 wherein:
   a. said lubricant deflector and said stationary baffle are an integral structure including an annular shroud encircling said shaft, said annular shroud being located radially outward of said fastening means, a ring member having a central opening therein through which said shaft passes, and axial ears;
   b. said conduit means comprises a plurality of generally radially directed conduit members formed in said integral structure, said conduit members being located at regular intervals with respect to the circumference of said shaft and including:
      i. a first end opening to the environment outside said stationary baffle, and
      ii. a second end opening inside said annular space at a location radially inward of said fastening means; and
   c. said duct means comprises a plurality of duct members formed in said integral structure, each said duct member being associated with one of said conduit members and including:
      i. a first duct member having a first end opening inside said annular space and communicating with said annular space at a location adjacent said annular shroud and proximate to and spaced circumferentially clockwise from said first end of said associated conduit member and a second end opening to the environment outside said stationary baffle at a location proximate to said annular passage, and
      ii. a second duct member having a first end opening inside said annular space and communicating with said annular space at a location adjacent said annular shroud and proximate to and spaced circumferentially counterclockwise from said first end of said associated conduit member and a second end opening to the environment outside said stationary baffle at a location proximate to said annular passage.

7. The self-pressurizing shaft seal recited in claim 6 wherein said integral structure includes a plurality of axial ears, each said axial ear having one of said conduit members formed therein.

8. The self-pressurizing shaft seal recited in claim 7 wherein said plurality of conduit members and said plurality of duct members are each four in number.

9. Apparatus for retarding the flow of lubricant axially along a shaft between a first lubricant cavity and a second lubricant cavity, the apparatus comprising:
 a. impeller means including:
  i. a disc mounted on the shaft with the plane of said disc normal to the shaft axis,
  ii. first blade means mounted to one side of said disc, and
  iii. second blade means mounted to the other side of said disc;
 b. a generally cylindrical casing coaxial with the shaft;
 c. a first wall wherein:
  i. said first wall, said disc, said casing and the shaft define a first annular space, and
  ii. said first blade means is disposed in said first annular space;
 d. a second wall wherein:
  i. said second wall, said disc, said casing, and the shaft define a second annular space, and
  ii. said second blade means is disposed in said second annular space;
 e. first conduit means for providing a fluid flow path into said first annular space, said first conduit means having:
  i. a first end opening to the environment outside said casing, and
  ii. a second end opening inside said first annular space and communicating with said first annular space at a location radially inward of said first blade means;
 f. second conduit means for providing a fluid flow path into said second annular space, said second conduit means having:
  i. a first end opening to the environment outside said casing, and
  ii. a second end opening to said second annular space and communicating with said second annular space at a location radially inward of said second blade means;
 g. first annular duct means including a first deflector wherein:
  i. said first deflector, said first wall, said casing, and the shaft define said first annular duct means, and
  ii. a first annular passage, communicating between said first annular duct means and the first lubricant cavity, is defined by said deflector and the shaft;
 h. second annular duct means including a second deflector wherein:
  i. said second deflector, said second wall, said casing, and the shaft define said second annular duct means, and
  ii. a second annular passage, communicating between said second annular duct means and the second lubricant cavity, is defined by said second deflector and the shaft;
 i. said first wall has a plurality of apertures therein for providing a fluid flow path out of said first annular space and into said first annular duct means, said apertures being located radially outward of said first end of said first conduit means; and
 j. said second wall has a plurality of apertures therein for providing a fluid flow path out of said second annular space and into said second annular duct means, said apertures being located radially outward of said first end of said second conduit means.

10. The apparatus recited in claim 9 wherein:
 a. said first conduit means includes a plurality of generally radially directed first conduit members, each of said first conduit members being located at regular intervals with respect to the circumference of the shaft; and
 b. said second conduit means includes a plurality of generally radially directed second conduit members, each of said second conduit members being located at regular intervals with respect to the circumference of the shaft.

11. The apparatus recited in claim 10 wherein said first conduit members extend through said casing and are secured to said first wall and said second conduit members extend through said casing and are secured to said second wall.

* * * * *